United States Patent [19]

Okada et al.

[11] Patent Number: 4,725,516
[45] Date of Patent: Feb. 16, 1988

[54] SEALED LEAD-ACID BATTERY

[75] Inventors: Kazuo Okada; Yuji Matsumaru; Joji Yamashita; Kenjiro Kishimoto, all of Takatsuki, Japan

[73] Assignee: Yuasa Battery Company Limited, Takatsuki, Japan

[21] Appl. No.: 787,028

[22] Filed: Oct. 15, 1985

Related U.S. Application Data

[63] Continuation-in-part of Ser. No. 661,160, Oct. 15, 1984, abandoned.

[30] Foreign Application Priority Data

Oct. 24, 1983 [JP] Japan .................. 58-198830

[51] Int. Cl.$^4$ .......................................... H01M 10/06
[52] U.S. Cl. ..................................... 429/225; 429/60; 429/204; 429/247
[58] Field of Search .................. 429/204, 205, 225, 59, 429/60, 129, 226, 228, 247, 252

[56] References Cited

U.S. PATENT DOCUMENTS

| | | | |
|---|---|---|---|
| 3,170,819 | 2/1965 | Abramson | 429/60 |
| 4,031,293 | 6/1977 | Voss et al. | 429/60 |
| 4,216,280 | 8/1980 | Kono et al. | 429/247 |
| 4,233,379 | 11/1980 | Gross et al. | 429/247 |
| 4,465,748 | 8/1984 | Harris | 429/247 |

FOREIGN PATENT DOCUMENTS 57-87080  5/1982  Japan .

OTHER PUBLICATIONS

Vinal et al., Battery Additives, p. 6, NBS Circular 504, 1951.

Primary Examiner—Anthony Skapars
Attorney, Agent, or Firm—Watson, Cole, Grindle & Watson

[57] ABSTRACT

The invention involves a sealed lead-acid battery comprising a cell element having positive plates, negative plates and separators, and electrolyte retained within micropore of the cell element.

The micropores of both the plates is substantially filled with the electrolyte, while the micropores of the separators are not completely filled with the electrolyte.

The voids formed partially in the micropores of the separators permit transport of the oxygen gas from the positive plates to the negative plates.

Such a sealed lead-acid battery has long service life, and excels in ability to $O_2$ absorb gases and reproduce water during overcharging and to recover by charging after a long overdischarged-state storage.

8 Claims, 3 Drawing Figures

SEALED LEAD-ACID BATTERY

This application is a continuation-in-part of application Ser. No. 661,160, filed Oct. 15, 1984, now abandoned.

BACKGROUND OF THE INVENTION

1. Field of the Invention

This invention relates to a sealed lead-acid battery, and particularly to a sealed lead-acid battery which is sealed by utilizing what is called an "oxygen cycle," i.e., the action of causing the oxygen gas that is evolved at the positive plate toward the end of charging to react with a negative active material.

2. Description of Prior Art

For a lead-acid battery to be sealed by the "oxygen cycle" the oxygen gas that is evolved toward the end of charging must be transported from the positive plates to the negative plates. In order to ensure this gas transport, a gelled electrolyte is used or absorption of the electrolyte by porous separators is adopted. Regarding the latter method, it has been recently reported that the porous separators are not completely filled with the electrolyte and voids for the transport of the oxygen gas from the positive plates to the negative plates are present in the porous separators.

The idea of using these porous separators in the sealed lead-acid battery is disclosed, for example, in U.S. Pat. No. 3,862,861. It states that the sealed lead-acid battery disclosed in characterized in one aspect by the hypothesis that the porous separators have a higher capacity for absorption of electrolyte than the plates and the electrolyte within the plates is present in the form of a thin film wrapped around particles of active materials. According to this disclosure, it is inferred that the electrolyte is substantially present within the separators. With a view to improving the high rate discharge characteristics, this U.S. patent contemplates reducing the discharge current density by using thin flexible "non-self-supporting" grids. To preclude the "non-self-supporting" grids from shortening the battery service life, the plate assembly is wound under exceedingly high pressure.

SUMMARY OF THE INVENTION

The present inventors tried an another approach to the improvement in the high-rate discharge characteristic and service life.

It has been widely known that the capacity of the sealed lead-acid battery of this type is generally affected by the concentration and amount of the electrolyte in the cell. It has been now found that the high-rate discharge characteristics is affected not only by the aforementioned concentration and amount of the electrolyte but also by its apportionment between the plates and separators of the plate assembly. For example, it has been demonstrated that, for the same concentration and the same amount of electrolyte to be added, the high-rate discharge characteristic are superior when the proportion of the electrolyte contained in the positive and negative plates is larger and the proportion in the porous separators is smaller than otherwise. This knowledge is partly described in JA-OS No. 87080/57, which was laid open for public inspection on May 31, 1982. In addition to this knowledge, it has been found that the pores of the positive and negative active material must be kept filled substantially with the electrolyte.

An object of this invention is to provide a sealed lead-acid battery which has long service life and exhibits little degradation of the high-rate discharge characteristic due especially to repeated cycles of charging and discharging.

Another object of this invention is to provide a sealed lead-acid battery which excels in ability to absorb $O_2$ gases and reproduce water during overcharging.

A further object of this invention is to provide a sealed lead-acid battery which excels in ability to recover by charging after a long overdischarged-state storage.

The other objects and characteristics of this invention will become apparent from the further disclosure of this invention to be made in the following detailed description of a preferred embodiment, with reference to the accompanying drawings.

DESCRIPTION OF PREFERRED EMBODIMENT

Figure 1:
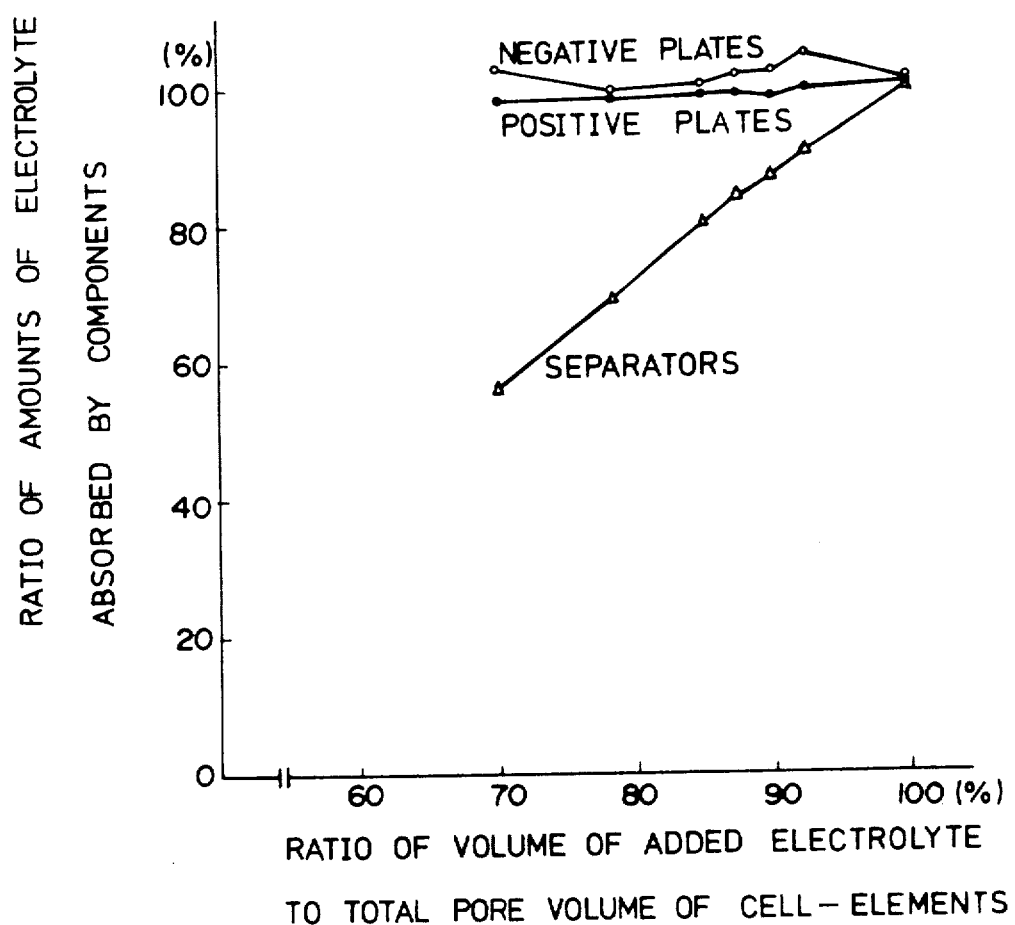
FIG. 1 is a graph showing changes in distribution or amounts of electrolyte absorbed by positive plates, negative plates, and separators in the sealed lead-acid battery of this invention as caused by the change in the total amount of electrolyte added to the cell.

The present invention will be described in detail below with reference to a preferred embodiment of the invention.

The paste for the positive plates was obtained by mixing 100 kg of fine lead oxide powder with an average particle diameter of about 4.5 $\mu$m and a specific surface are of about 1.40 $m^2/g$ as measured by the BET method (hereinafter all the values of specific surface areas are invariably those measured by the same method) with 20 liters of sulfuric acid with a specific gravity of 1.14 d. Positive plates were obtained by applying the paste on cast grids of a Pb-0.09% Ca and 0.55% Sn alloy with a thickness of 3.4 mm, curing and forming thereof under ordinary conditions. The positive plates measured 76 mm in width, 82 mm in height, and 3.4 mm in thickness and contained 60 g of active material. The positive active material had a specific surface area of about 3.5 $m^2/g$ and an average pore diameter of about 0.32 $\mu$m.

The aforementioned lead oxide powder was mixed with the ordinary expanders and other additives. The paste for the negative plates was obtained by mixing 100 kg of the lead powder mixture with 15 liters of dilute sulfuric acid with a specific gravity of 1.12 d. Negative plates were produced by applying the paste on grids with the same alloy composition as that used in the grids for the positive plates of 76 mm in width, 82 mm in height, and 1.9 mm in thickness. The pasted negative plates were also cured and formed under ordinary conditions. The amount of the negative active material thus obtained weighed about 33 g per plate. The negative active material had a specific surface area of about 0.43 $m^2/g$ and an average pore diameter of about 1.0 $\mu$m.

A separator was prepared in the form of a sheet having a width of 83 mm and height of 88 mm, which was made by entangling together 90 wt% glass fibers having a nominal fiber diameter of about 0.8 μm with 10 wt% glass fibers having a nominal fiber diameter of about 11 μm without any binder by the wet method. This separator had a weight of 160 g/m$^2$, a specific surface area of about 1.45 m$^2$/g, an average pore diameter of about 7 μm, and a true specific gravity of 2.5.

A cell element was assembled by alternately superimposing three positive plates and four negative plates with the separators placed between them. The cell element with a thickness of 23.5 mm was inserted in an electric cell. In this case, each distance between the plates was 0.95 mm and the pressure exerted on each assembled plate was about 15 kg/dm$^2$. The total specific surface area per unit cell, therefore, was about 630 m$^2$/cell for the positive active material, about 57 m$^2$/cell for the negative active material, and about 10 m$^2$/cell for the separators.

Cell elements produced as described above were added severally in 100, 92.5, 90, 87.5, 85, 80, and 70 cc/cell of the electrolyte and then stood for 24 hours. After standing, they were lifted from the containers and examined to determine the amounts of electrolyte contained in the positive plates, negative plates, and separators. With the addition of 100 cc/cell, a certain amount of free electrolyte apparently existed in the cell. With the addition of 100 cc/cell of electrolyte, the volume of electrolyte contained per unit weight was 0.14 cc/g for the positive active material, 0.17 cc/g for the negative active material, and 7.8 cc/g for the separators. Based on these values, each taken as 100%, the changes in the volumes of the electrolyte contained in the positive plates, negative plates, and separators were evaluated. The results were as shown in FIG. 1. Though with the addition of 100 cc/cell there existed some free electrolyte, in FIG. 1, this value indicated as the point at which "the ratio of the volume of the added electrolyte to the total pore volume of the cell element" was 100%. From FIG. 1, it is noted that when the cell elements are formed of components possessing pore diameter, specific surface area, and other properties as the electrolyte was added in varying amounts to the cell element, there was a reduction in the amount of electrolyte in the separators and there was no change in either the positive active material or the negative active material. The fact indicates that when a battery is produced by assembling such components with these particular properties, the pores of the positive active material and the negative active material are always filled with the electrolyte and the separators permit presence of voids not filled with the electrolyte even when the total amount of the electrolyte is decreased by overcharging. Even if the amount of the electrolyte is decreased by overcharging, the positive plates and the negative plates are still fully filled with the electrolyte. Since the high-rate discharge characteristic is affected by the electrolyte contained in the positive plates and the negative plates, the cell element with such a characteristic is enabled to maintain the high-rate discharge characteristic at a sufficiently high level even when the electrolyte is decreased by overcharging. Besides, the separators possess the voids which are necessary for the oxygen gas evolved at the positive plates during overcharging to the transported from the positive plates to the negative plates. It is, accordingly, expected that the efficiency of the absorption of the oxygen gas reaches an exceedingly high level when the amount of the electrolyte is decreased to a certain level.

Figure 2:
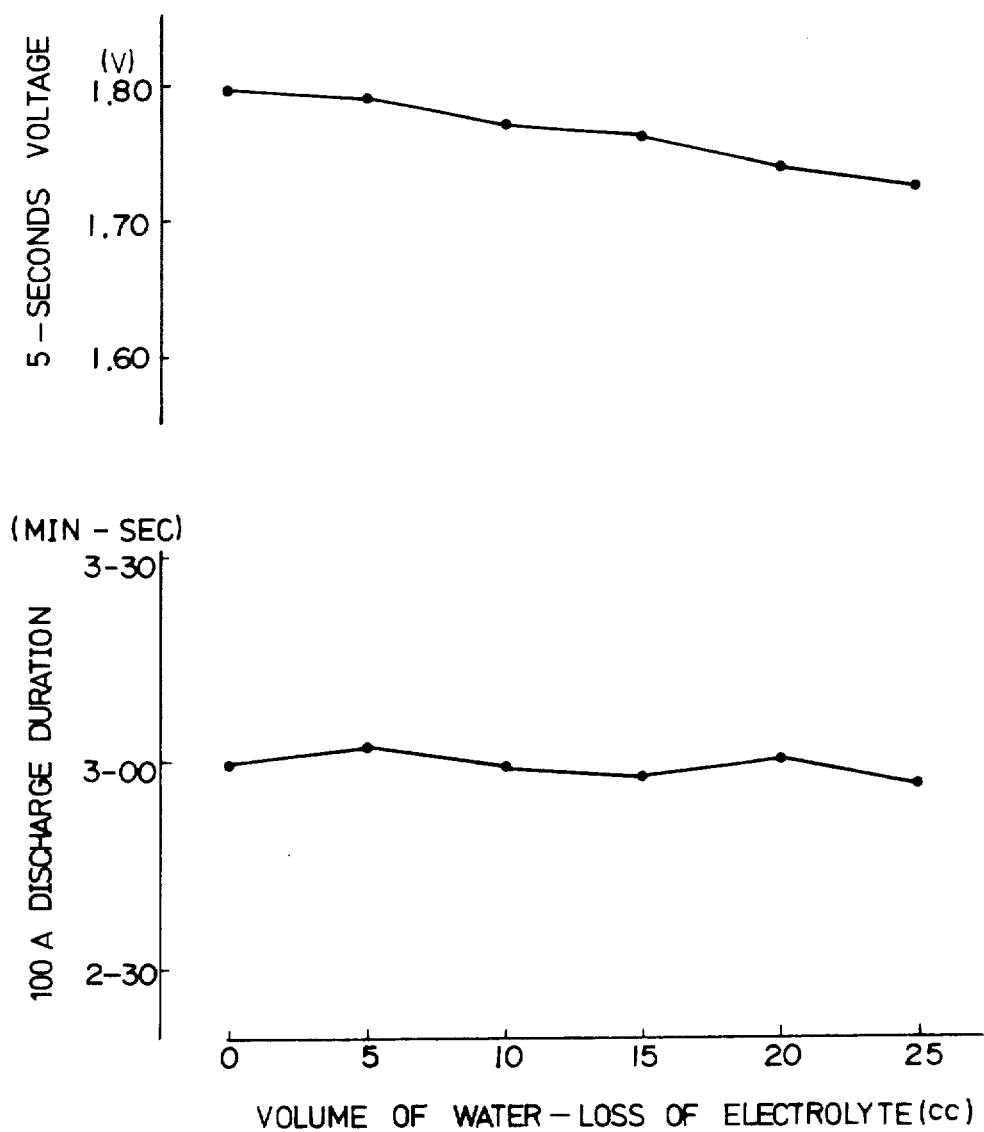
FIG. 2 is a graph showing the relation between the amount of water-loss of electrolyte and the high-rate discharge characteristic in the sealed lead-acid battery of this invention.

Sealed lead-acid batteries were obtained by inserting the cell elements assembled as described above in a container, welding a strap, joining a lid to the container, adding dilute sulfuric acid with 1.30 specific gravity at an amount of 100 cc/cell, and fitting in a safety valve with a venting pressure of 0.2 kg/cm$^2$. The sealed lead-acid batteries thus obtained exhibited a 10-hour rate discharge capacity of 11 AH, a 10C (110 A) discharged duration of 3 minute 00 second, and a 5-second voltage at discharge of 1.80 V per unit cell. These batteries were overcharged at a current of 3C (33 A) to decrease forcedly 5, 10, 15, 20, and 25 cc in the volume of electrolyte per cell, respectively. These batteries for the test were subjected to 110 A discharged at 25° C. The results were as shown in FIG. 2. It is noted from FIG. 2 that the sealed lead-acid batteries of the present invention retained the superior high-rate discharge characteristic even after the volumes of their electrolyte were decreased. FIG. 2 shows that the value of the 5-second voltage at discharge gradually decreases in accordance with the decrease of the electrolyte grows. This behavior can be explained on the basis that since the amount of the electrolyte decreased in the separators (FIG. 1), the resistance in the separators increased proportionately.

Figure 3:
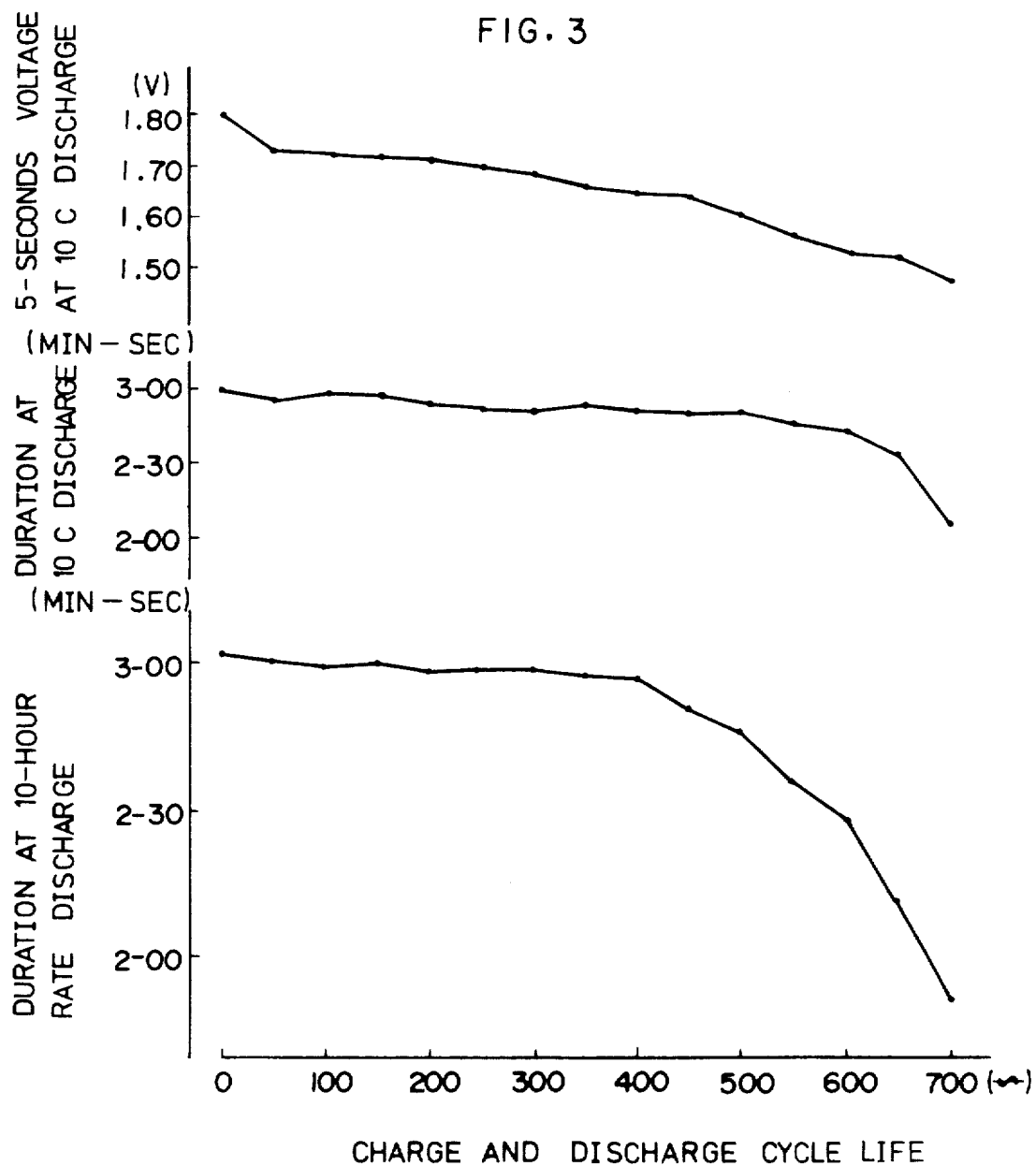
FIG. 3 is a graph showing the alternate charge and discharge cycle life of the sealed lead-acid battery of this invention.

Sealed lead-acid batteries which had the same construction as described above but contained 95 cc/cell of electrolyte were subjected to an alternating charging and discharging cycle-test of 4 A discharge for 2 hours and 1.7 A recharge for 6 hours. At intervals of 50 cycles, the batteries were given a high-rate discharge test at a discharge current of 110 A and a 3-hour rate discharge test. The change in the high-rate discharge characteristic along the advance of cycles is shown in FIG. 3. In the test, the efficiency of gas recombination averaged 80% during the first 50 ∞ and it was substantially 100% in the subsequent cycles, indicating no decrease in the amount of the electrolyte. This means that the sealed lead-acid battery of this invention exhibits little or no sparing decline of the high-rate discharge characteristic after repeated operation of charging and discharging cycles and possesses a long service life.

The conventional sealed lead-acid battery according to the invention disclosed in U.S. Pat No. 3,862,861, for example, was assembled with the positive plates and negative plates both of an extremely thin thickness of more or less 1.0 mm and a very large plate surface area, which were enable to lower or reduce the discharge current density and to improve the high-rate discharge characteristics. During the 10C discharge of the conventional sealed lead-acid battery, the discharge current density based on one side-surface area of the positive plate is about 0.3 A/cm$^2$ and the discharge duration is about one minute 50 seconds to about two minutes 30 seconds. When the sealed lead-acid battery of this invention is tested under the same conditions, the discharge duration is about three minutes in spite of the condition that the discharge current density based on one side surface area of the positive plate is about 0.6 A/cm$^2$, which is twice larger that of the conventional sealed lead-acid battery. To obtain a superior high-rate discharge characteristic without sacrificing the other characteristics, the optimum thickness of the grids for the positive plates is from 3 to 4 mm. By fixing the proper thickness of the grids within that range, the proper thickness of the separators is able to be used calculated eventually. Moreover, this invention permits the sealed lead-acid battery to maintain the high-rate discharge characteristics during its long service life. Further, even at a lower stacking pressure the sealed lead-acid battery of this invention can be expected to have a longer service life than the sealed lead-acid battery conforming to the invention of U.S. Pat. No. 3,862,861 because the grids of this invention are about three times thicker than that of the battery of the noted U.S. patent.

A sealed lead-acid battery of this invention can be obtained by selecting appropriately the positive plates, negative plates and the separators with a certain suitable range of pore diameter, specific surface area and other properties so as to become to the construction within the size of plate which comprises a larger amount of electrolyte contained in the positive and negative active materials than that in the separators and so as to be no decrease in the amount of electrolyte in the positive and negative active materials in spite of the condition that the total volume of electrolyte in the cell is reduced due to overcharging. That is in the case of the preferred embodiment described above, by evaluating the distribution of the electrolyte content of the cell element within the plate size, the positive plates contain about 25 cc/cell, negative plates contain about 23 cc/cell, and the separators contain about 34 cc/cell, representing the content ratios of about 30.5% for the positive plates, about 28.0% for the negative plates, and about 41.5% for the separators and indicating that the sum of the electrolyte contained in the positive plates and the negative plates is about 60% of the whole electrolyte so contained. Moreover, the electrolyte contained in the positive and negative plates remains intact and that contained in the separators alone is lost when the whole amount of the electrolyte is decreased due to the water electrolysis during overcharging, therefor the ratio sum of the electrolyte contained in the positive plates and the negative plates to the whole amount of the electrolyte in the cell gradually increased from the aforementioned value of 60%. Thus, the high-rate discharge characteristic cannot be impaired.

As mentioned above, in order to establish the condition that only the electrolyte in the separators decreases and the electrolyte in the positive plates and the negative plates always remains filling them when the total amount of the electrolyte is decreased, the separators for use in the battery must be selected so that the electrolyte absorption and retention power of capability of separators will be lower than that of the positive active material and the negative active material. Although it is not clarified completely what properties determine the electrolyte absorption and retention power or capability of each of the component elements of the cell element, it may be safely inferred that the electrolyte absorption power and the elecrtrolyte retention capability are affected by the wettability of the each component with the electrolyte, the specific surface area of each component per unit volume, the pore diameter distribution, and so on. When the foregoing preferred embodiment is reviewed in terms of specific surface area (Sv) per unit volume on the basis that the positive plates, negative plates, and separators have 8, 11, and 2.5 g/cc as their respective values of true specific gravity, the values of Sv is found to be about 28, about 4.73, and about 3.6 $m^2/cc$., respectively. Thus, the separators are shown to have the smallest value of Sv. The separators marketed under trademark designation Dexter #225B (product of The Dexter Corp., USA) are of the separators usable for batteries of this kind. The separators of Dexter #225B have a specific surface area of about 2.5 $m^2/g$, which is greater than that of the separators involved in the preferred embodiment by this invention, 1.45 $m^2/g$ and which is corresponding to be Sv of 6.25 $m^2/cc$ on the basis of its true specific gravity of 2.5 g/cc, which is a value larger than that of the negative active material. If the separators of Dexter #225B are used in the sealed lead-acid battery by this invention, there is a possibility that the pores in the positive plates and the negative plates will not be substantially filled with the electrolyte when the total amount of the electrolyte is decreased. Further, because separators of Dexter #225B have an average pore diameter of about 3 $\mu m$, which is a value smaller than the value about 7 $\mu m$ shown by the separators of the preferred embodiment, and eventually the electrolyte absorption and retention power of separators is stronger, there remains the above-mentioned anxiety. When separators having such a high Sv value as Dexter 225B are effectively used in the sealed lead-acid battery by the present invention, the plates, particularly the negative plates are required to have a larger specific surface area. The plates, therefore, are required to be made of lead oxide powder with much smaller particle diameter than above or most be made of a material incorporating therein various additives which are capable of notably increasing the specific surface area of the plates.

The characteristics disclosed by this invention that the electrolyte should substantially fill the pores of the plates and that there exist unfilled voids in part of the pores of the separators is fulfilled by using separators which have a smaller, preferably slightly smaller electrolyte absorption and retention power or capability than the plates. Such types of separators are also usable in sealed lead-acid batteries which require no or inferior high-rate discharge characteristics, namely such as the sealed lead-acid batteries for emergency power sources in which the distance between each plates is from about 1 to 2.5 mm. This kind of sealed lead-acid battery is also embraced by the present invention. What is important is that the separators to be adopted should possess a smaller electrolyte absorption and retention power or capability than the plates. Although the inventors have not yet found the characteristic properties completely which permits suitable expression of the electrolyte absorption and retention power and capability, when the cell element is assembled as specifically discussed in the preferred embodiment, the electrolyte is distributed so that the pores in the active materials of the plates remain fully filled with the electrolyte and the pores in the separators permit partial existence of voids when the total volume of the electrolyte is decreased. By using the cell element with the construction as described above, there can be obtained a sealed lead-acid battery which enables to maintain not only the superior low rate discharge characteristic but also the initial-stage high-rate discharge characteristic for a long time during the service life of the battery even when the total amount of the electrolyte is decreased. The initial-stage high-rate discharge characteristic itself is controlled preponderantly by the distances between the positive plates and the negative plates, and the amount of electrolyte in positive active material and the negative active material, particularly the amount of sulfuric acid contained in the positive active material. For example, when the battery is so produced that the distances between each plate have a thickness of 2.0 mm and the sum of the amount of the electrolyte contained in the positive active material and the negative active material is 40% of the total electrolyte (then the content in the separators is 60%), high-rate discharge characteristic is not very satisfactory. If the separators of the battery have a higher capacity for absorption and retention of the electrolyte than the plates, the high-rate discharge characteristic of the battery may be further degraded because the amount of the electrolyte in the plates gradually decreases as the total electrolyte of the battery decreases owing to the water electrolysis. When the separators assembled in the cell element have a smaller electrolyte absorption and retention power or capability than the plates as disclosed by this invention, the produced battery is characterized by the matter that the initial-stage high-rate discharge characteristic can be retained intact in spite of the decrease of the total amount of the electrolyte due to water electrolysis. It can be easily explained that since the time required for diffusion of the oxygen gas through the separator increases in proportion as the distances between the positive plate and negative plate are widened in thickness, the efficiency of gas recombination tends to degrade in proportion at the distances between the plates are widened. In the sealed lead-acid battery by this invention, bacause the voids become to be formed in the separators in consequence of the decrease of the electrolyte due to water electrolysis such a situation permits easy transport of the oxygen gas from the positive plates to the negative plates, and thus, the efficiency of gas recombination is amply high even when the distances between the plates are widened.

The sealed lead-acid battery of this invention, when intended for an application necessitating the superior high-rate discharge characteristic, is disclosed by using separators with a thinner thickness than the plates, particularly the positive plates. To prevent short-circuiting and to ensure satisfactory high-rate discharge characteristic, the thickness of the separators is desired to be in the range of 0.4 to 0.25 times the thickness of the positive plates. The distance between the positive plates and the negative plates is 0.7 to 1.0 mm when the thickness of the positive plates is 3 to 4 mm. In the preferred embodiment described above, for example, the separators used therein had a thickness of about one third of the thickness of positive plates. The reason for such a range is that the high-rate discharge characteristic is degraded if the thickness exceeds 0.4 times and the possibility of short-circuiting arises if the thickness is less than 0.25 times.

With respect to theoretical capacity, in the sealed lead-acid battery of this type, the total amount of the positive active material and the negative active material is greater than that of the electrolyte. That is, the capacity of the sealed lead-acid battery is affected by the amount of the electrolyte (namely the amount of sulfuric acid) and, even toward the end of discharge, the active materials still retain some undischarged portion. Such a condition applies to the sealed lead-acid battery of this invention. In the overdischarged condition, the electrolyte becomes nearly water. Particularly in the battery of the present invention, this phenomenon is outstandingly conspicuous because the sum of the amount of the electrolyte contained in the positive plates and the negative plates is about 60% or more for the total electrolyte. When the battery is left standing long at the overdischarged state, lead is dissolved. Because the dissolved lead ions is precipitated to be metal in the separators during the next recovery charging, there is a high possibility of causing short-circuit between the positive plates and the negative plates. When the battery is designed specifically to be used for high-rate discharge, the possibility of short-circuit is more outstanding because the thickness of separators is thinner than that of plates. To reduce the concentration of the dissolved lead, therefore, it is desirable to add to the electrolyte such an alkali metal salt as Na, K, or Li salt as an impurity matter. Although such an addition of an impurity matter constitutes itself a known technique to the art, in the case of the sealed lead-acid battery of this invention, the amount of impurity matters must be greater than the normally accepted levels or ranges because the sum of the amount of the electrolyte contained in the positive active material and the negative active material is greater than the amount of the electrolyte contained in the separators and because the thickness of the separators is thinner than that of the plates. To determine the optimum amount of the addition of the alkali metal salts, the following experiments were carried out.

Experiments:

Batteries were produced with the same construction as used in the aforementioned tests for service life through alternating charging and discharging cycle. Electrolytes were prepared by adding 0.1, 0.5, 1.0, 1.5, 2.0, 5.0 and 10.0%, respectively, of $K_2SO_4$ to dilute sulfuric acid solution with 1.30 specific gravity. The electrolytes were severally added to each battery same in a volume of 90 cc per cell. These batteries were discharged to 0 V and then left standing at the outer short-circuit state at room temperature for two weeks. Then these batteries were checked whether there occurred the short-circuiting and determined whether or not they could be recharged. The results were as shown in Table 1 below. It is noted from Table 1 that the amount of $K_2SO_4$ added is desired to be more than at least 1.0%. Although this experiment offered insufficient definite data for the upper limit to the amount of the alkali metal salt, it is practically desirable to fix the upper limit at 5.0% in taking into consideration of self discharge and operation of dissolving.

TABLE 1

| Amount of $K_2SO_4$ added (%) | Occurrence of short-circuit |
| --- | --- |
| 0.1 | Yes |
| 0.5 | Yes |
| 1.0 | No |
| 1.5 | No |
| 2.0 | No |
| 5.0 | No |
| 10.0 | No |

In the case of the sealed lead-acid battery by the present invention, in order to improve the high-rate discharge characteristics particularly at low temperatures, the amount of the positive active material is desired to be larger than that of the negative active material. It is well known that in the conventional lead-acid battery with the free electrolyte the high-rate discharge characteristic at low temperature is controlled mainly by the negative plates. In the case of the sealed lead-acid battery by this invention, the high-rate discharge characteristic at low temperature is controlled not by the negative plates but by the amount of sulfuric acid present in the positive active material. It is, therefore, desirable for the pore volume contained in the positive active material to be equal to or greater than that in the negative active material. When the specific pore volume (Vsp) of the positive active material is evaluated to be 0.14 cc/g and that ($V_{SN}$) of the negative active material at 0.17 cc/g, for example, since the ratio of $V_{SN}/V_{sp}$ is 1.21, the amount of the active material for the positive plates is desired to be 1.21 times or more than the amount for the negative plates, although the amount of the pores in positive plate is variable with the amount of sulfuric acid used in mixing the finely divided lead oxide powder.

In terms of theoretical capacity of active materials, therefore, the positive plates are desired to be larger in the capacity than the negative plates in the sealed lead-acid battery by the present invention. In evaluating the ratio of the positive active material and the negative active material to the theoretical capacity $1 \div 3.867 = 0.259$ for the negative plates and $1.21 \div 4.463 = 0.271$ for the positive plates and, therefore, the ratio of the theoretical capacity of the negative plates to that of the positive plates is desired to be less than 0.954 because $0.259 \div 0.271 = 0.954$. It is clear from the data given in the preferred embodiment that such a this relationship has no adverse effect upon the "oxygen cycle."

As many apparently widely different embodiments of this invention may be made without departing from the spirit and scope thereof, it is to be understood that the invention is not limited to the specific embodiments thereof except as defined in the appended claims.

What is claimed is:

1. A sealed lead-acid battery which will retain a high-rate discharge characteristic even though subjected to repeated cycles of charging and discharging and even though the amount of electrolyte therein decreases below an optimum operational amount due to overcharging, said sealed lead-acid battery comprising a cell element and an electrolyte, said cell element including
    positive plates each having a thickness of between 3 and 4 mm and containing a positive active material and micropores, said positive active material having a specific surface area per unit volume and a total surface area,
    negative plates containing a negative plate material and micropores, said negative active material having a specific surface area per unit volume and a total surface area, and
    separators between said positive plates and said negative plates, said separators being made of a material containing preponderantly glass fibers and micropores, said material having a specific surface area per unit volume and a total surface area, the specific surface area per unit volume of the material of said separators being smaller than the specific surface area per unit volume of either said positive active material or said negative active material and the total surface area of the material of said separators being smaller than the total surface area of either said positive active material or said negative active material, and said separators having a lower electrolyte absorptivity and retention power than said positive or negative plates,
    said electrolyte being distributed within said cell such that the sum of the amount of electrolyte contained in said positive plates and in said negative plates is greater than the amount of electrolyte contained in said separators and such that the micropores of said positive and negative plates will remain substantially filled with electrolyte whereas the micropores of said separator will be only partially filled as the amount of electrolyte in said cell element decreases below its optimum amount.

2. The sealed lead-acid battery according to claim 1, wherein said positive plates have a thickness of between 3 and 4 mm and wherein said positive plates are spaced from said negative plates by a distance of between 0.7 and 1.0 mm.

3. The sealed lead-acid battery according to claim 1, wherein the distance between said positive plates and said negative plates is between 0.4 and 0.25 times the thickness of said positive plates.

4. The sealed lead-acid battery according to claim 1, wherein said electrolyte contains 1.0 to 5.0% by weight of at least one alkali metal selected from the group consisting of K, Na and Li.

5. The sealed lead-acid battery according to claim 1, wherein the amount of said positive active material is at least 1.21 times that of said negative active material, and wherein the discharge current density based on one said surface of a positive plate at a 10C discharge is between 0.5 and 0.9 A/cm².

6. The sealed lead-acid battery according to claim 1, wherein said separators contain 90% by weight of glass fibers having a nominal fiber diameter of about 0.8 μm and 10% by weight of glass fibers having a nominal fiber diameter of about 11 μm.

7. The sealed lead-acid battery according to claim 1, wherein said separators have a weight of about 160 g/m², a specific surface area of about 1.45 m²/g, an average pore diameter of about 7 μm and a true specific gravity of about 2.5.

8. The sealed lead-acid battery according to claim 1, wherein the micropores in said positive plates have an average diameter of about 0.32 μm and the micropores in said negative plates have an average diameter of about 1.0 μm.

* * * * *